Nov. 17, 1936.    L. E. LA BRIE    2,060,878
BRAKE
Filed March 8, 1934    2 Sheets-Sheet 1

INVENTOR.
LUDGER E. LA BRIE
BY Jerome R. Cox
ATTORNEY

Nov. 17, 1936.   L. E. LA BRIE   2,060,878
BRAKE
Filed March 8, 1934   2 Sheets-Sheet 2

INVENTOR.
LUDGER E. LaBRIE
BY Jerome R. Cox
ATTORNEY

Patented Nov. 17, 1936

2,060,878

UNITED STATES PATENT OFFICE 2,060,878

BRAKE

Ludger E. La Brie, South Bend, Ind., assignor to Bendix Aviation Corporation, South Bend, Ind., a corporation of Delaware Application March 8, 1934, Serial No. 714,672

5 Claims. (Cl. 188—72)

This invention relates to friction brakes for motor vehicles and more particularly to a brake composed of disc-shaped friction surfaces, one of which is fixed to the propeller shaft and having resilient means holding the friction surfaces normally out of engagement with each other. In the embodiment shown, the member fixed to the shaft is designated the rotor member and the cooperating fixed disc-shaped friction member is called the stator member.

An object of this invention is to provide a structure of the character indicated that will be economical to manufacture, strong, durable and quickly and easily assembled and disassembled.

A further object of the invention is to provide a simple, yet strong and durable method of restraining the stator member from rotation as the rotor member is urged in contact therewith.

Another object of the invention is to design a brake composed of spaced apart rotatable and non-rotatable disc-shaped members, and to provide simple and substantial means for shifting one into engagement with the other, and resilient means for automatically disengaging the disc-shaped members when the pressure is relieved from the actuating member.

With the foregoing and other objects in view, this invention consists in the combination and arrangement of parts, hereinafter more fully described, and illustrated in the accompanying drawings, which are submitted merely to illustrate the invention and not to define the scope thereof, reference being had for that purpose to the subjoined claims.

In the drawings, wherein similar reference characters refer to similar parts throughout the several views.

Figure 1:
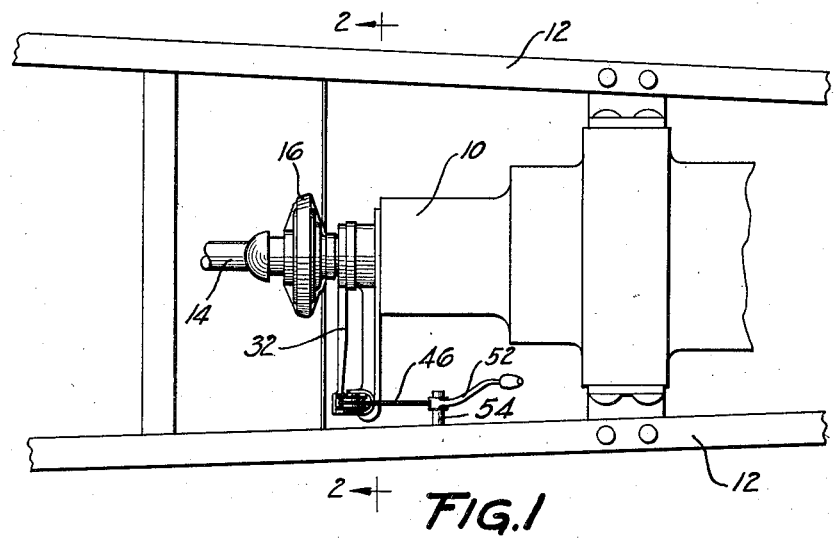
Figure 1 is a plan view of a portion of an automobile chassis showing a device of the present invention as applied thereto.

Referring more particularly to Figure 1 there is shown a transmission 10 suspended between two parallel frame members 12. A propeller shaft 14 transmits power from the transmission 10 to a differential of conventional design, not shown.

Figure 2:
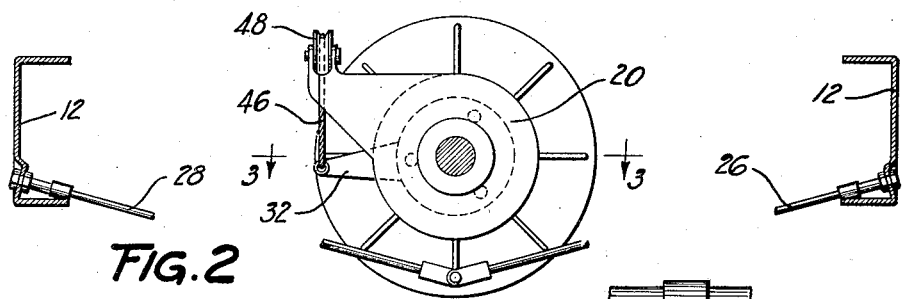
Figure 2 is a view in section taken on line 2—2 of Figure 1, showing the method of anchoring the stator member.
Figure 5:
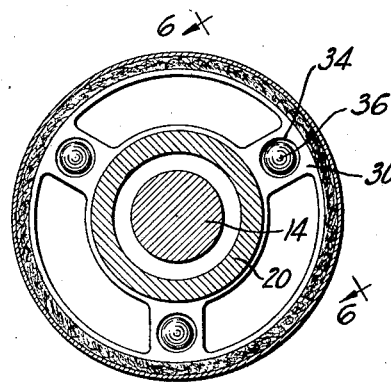
Figure 5 is a view in section taken on line 5—5 of Figure 3 showing a portion of the disc actuating mechanism.
Figure 6:
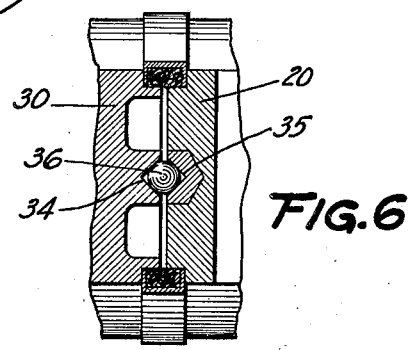
Figure 6 is a view in section taken on line 6—6 of Figure 5 showing a portion of the disc actuating mechanism.

The brake device of this invention designated as a whole by the reference numeral 16 surrounds the propeller shaft 14 immediately posterior to the transmission 10. A rotor disc member 18 is fixed to the propeller shaft 14 by means of a key or other suitable fastening device. A sleeve 20 loosely mounted on propeller shaft 14 is fixed to the transmission housing 22 by any suitable fastening means such as bolts. A stator disc member 24 slidably mounted on sleeve 20 is anchored against rotation by means of two opposed rods 26 and 28 (Figure 2) connecting a common point on its outer periphery with the opposed parallel frame members 12—12. A collar 30 having an arm 32 extending laterally therefrom is slidably mounted over sleeve 20. Collar 30 may rotate to a limited extent but sleeve 20 is fixed against rotation. Said collar 30 and sleeve 20 are formed in their opposed inside faces with a plurality, preferably three, equally spaced matching conical indentations 34 and 35 respectively, which receive anti-friction ball members 36 whose function it is to force the two matching surfaces apart when the collar 30 is rotated. The opposite end of collar 30 is separated from stator member 24 by means of anti-friction ball bearings 38 to permit easy relative rotation between the two members. Stator member 24 carries a facing of friction material 40 designed to engage the metal surface of rotor disc 18 when the two discs are urged into abutting relation. A spring 42 interposed between a stop 44 carried by sleeve 20 and stator disc 24 operates to yieldingly urge the stator and rotor discs out of engagement and to rotate collar 30 so that normally ball members 36 are fully seated in conical indentations 34. Arm 32 fixed to collar 30 and extending laterally therefrom is operated by a flexible cable 46 which passes over a pulley 48 and is connected to an arm 50 carried by a lever 52 pivoted on stud 54.

Figure 3:
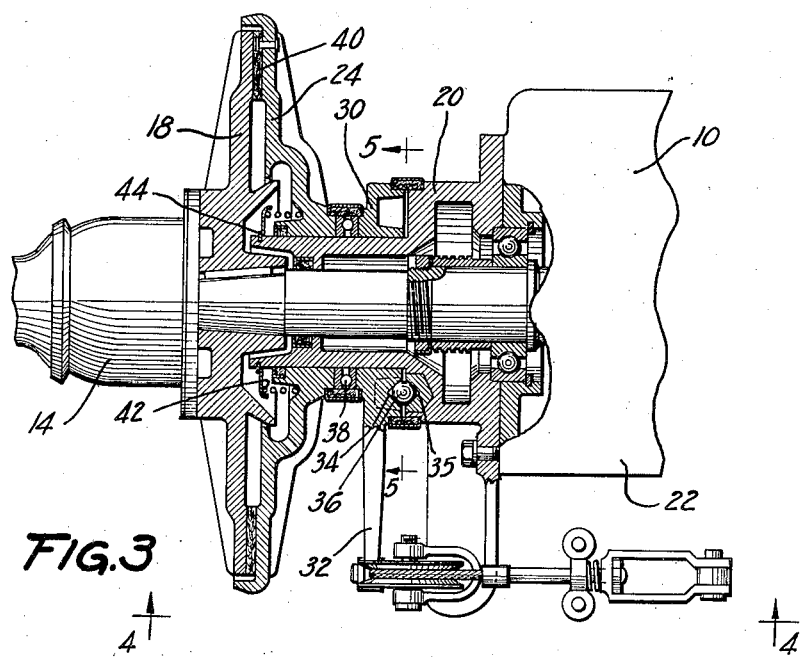
Figure 3 is a horizontal section taken on line 3—3 of Figure 2, showing some of the details of construction.
Figure 4:
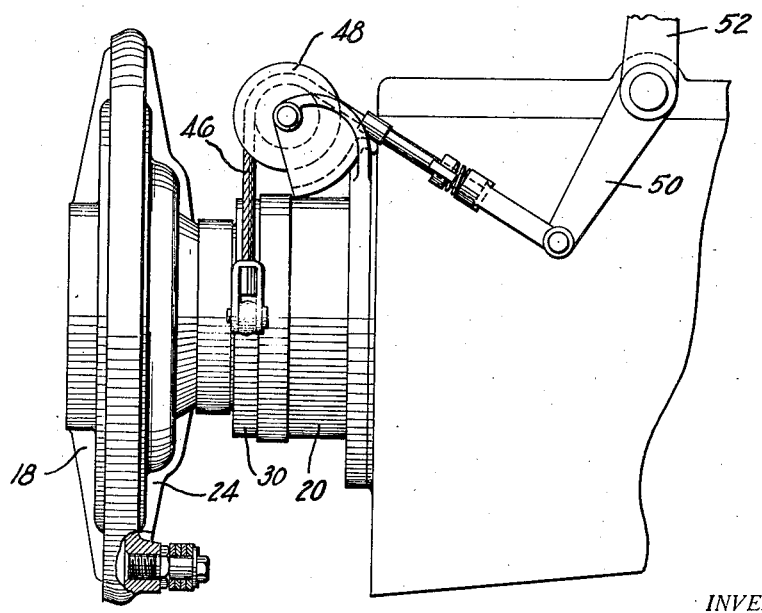
Figure 4 is an elevation taken on line 4—4 of Figure 3.

The operation of this device is as follows. When the operator wishes to apply the brake he pulls up on lever 52 thereby rotating arm 50 in the counterclockwise direction as viewed in Figure 4. Flexible cable 46 is thereby drawn over pulley 48 rotating arm 32 in the clockwise direction as viewed in Figure 2. Since arm 32 is fixed to collar 30, and sleeve 20 is fixed to the transmission housing 22 relative rotation between the collar and sleeve must result when arm 32 is rotated. Ball members 36 interposed between collar 30 and sleeve 20 in the conical indentations 34 and 35 force the two members to move laterally relative to each other as collar 30 is rotated. Sleeve 20 is restrained from lateral displacement by the transmission housing 22 so that collar 30 is forced to move to the left as viewed in Figure 3. Ball bearings 38 interposed between collar 30 and stator disc 24 permit relative rotation between the two members and transmit lateral force to stator disc 24 thereby compressing spring 42 and urging the friction facing 40 carried by stator disc 24 into contact with the metal surface of rotor disc 18 fixed to propeller shaft 14. The harder the surfaces are urged together the greater will be the braking effect. Stator member 24 is restrained from rotation by means of opposed rods 26 and 28 extending from its outer periphery to parallel frame members 12—12.

When the vehicle has stopped or the operator wishes to release the brake he merely releases lever 52 holding the brakes applied. Spring 42 will then move stator member 24 laterally on sleeve 20, which, by means of ball bearings 38, will move collar 30 to the right as viewed in Figure 3. Collar 30 will be forced to rotate as it moves laterally until ball members 36 are fully seated in conical indentations 34 in which position the stator disc 24 is out of contact with rotor disc 18 and the brake is inoperative.

Since the braking effect of this device is applied directly to the propeller shaft it may be used as a parking brake to hold the vehicle when the engine is not running.

Although the invention has been described with reference to a specific embodiment, it is not my intention to limit the scope thereof to the embodiment shown, nor otherwise than by the terms of the subjoined claims.

I claim:

1. In a propeller shaft brake for motor vehicles having an engine, wheels, parallel frame members and a propeller shaft for transmitting power from the engine to the wheels, a sleeve on the propeller shaft, a collar on the sleeve, an arm fixed to the collar, a rotor disc fixed to the propeller shaft, a stator disc slidably mounted on the sleeve, friction facing material carried by the stator disc, conical indentations between the matching surfaces of the collar and sleeve, ball members in the conical indentations, ball bearings between the opposite end of the collar and the stator disc, a flexible cable fixed to the arm extending from the collar, a pulley for the flexible cable, a lever to actuate the flexible cable and anchorage means for the stator member comprising opposed rods extending from a common point on the outer periphery of the stator member to the opposed parallel frame members for anchoring the stator member from rotation.

2. In a servo brake for motor vehicles having a propeller shaft and parallel frame members, a rotor disc fixed to the propeller shaft, a sleeve slidably mounted on the propeller shaft, a stator disc slidably mounted on the sleeve, a collar rotatably mounted on the sleeve, an arm fixed to the collar, means including ball members positioned in matching conical indentations in the cooperating surfaces of the collar and sleeve to urge the stator disc into contact with the rotor disc, and means including brace members interconnecting the stator disc and the parallel frame members.

3. In a vehicle having parallel frame members, a drive shaft positioned between the frame members, a rotor member fixed to the drive shaft, a stator member rotatably and slidably mounted with respect to the drive shaft, wedging means operably associated with the stator member to urge the rotor and stator members into engagement, and means including a pair of oppositely disposed braces interconnecting the stator member and the frame members to hold the stator member from rotating with the rotor member.

4. In a motor vehicle having an engine, wheels, parallel frame members, a propeller shaft for transmitting power from the engine to the wheels, a propeller shaft brake comprising a rotor disc fixed to the propeller shaft, a stator disc slidably mounted on the propeller shaft, friction facing material carried by one of the disc members, means including a sleeve associated with the propeller shaft and wedging means engaging the sleeve for urging the stator disc into contact with the rotor disc, means including laterally opposed rods extending from the outer periphery of the stator member to the opposed parallel frame members for anchoring the stator member from rotation, means including an arm fixed to the sleeve and a manually operable member connected to the arm for urging the stator disc into contact with the rotor disc.

5. A vehicle having an engine, parallel frame members, a drive shaft operably connected with the engine and positioned between the frame members, a friction rotor member fixed to the drive shaft, a sleeve having an arm fixed thereto associated with the drive shaft, a friction stator member slidably mounted with respect to the sleeve, wedging means to urge the rotor and stator members into engagement upon rotation of said arm, and means including a pair of oppositely disposed members interconnecting the stator member and the frame members to hold the stator member from rotating.

LUDGER E. LA BRIE.